S. T. Lamb.
Harvester Rake.
Nº 17685  Patented Jun. 30, 1857.
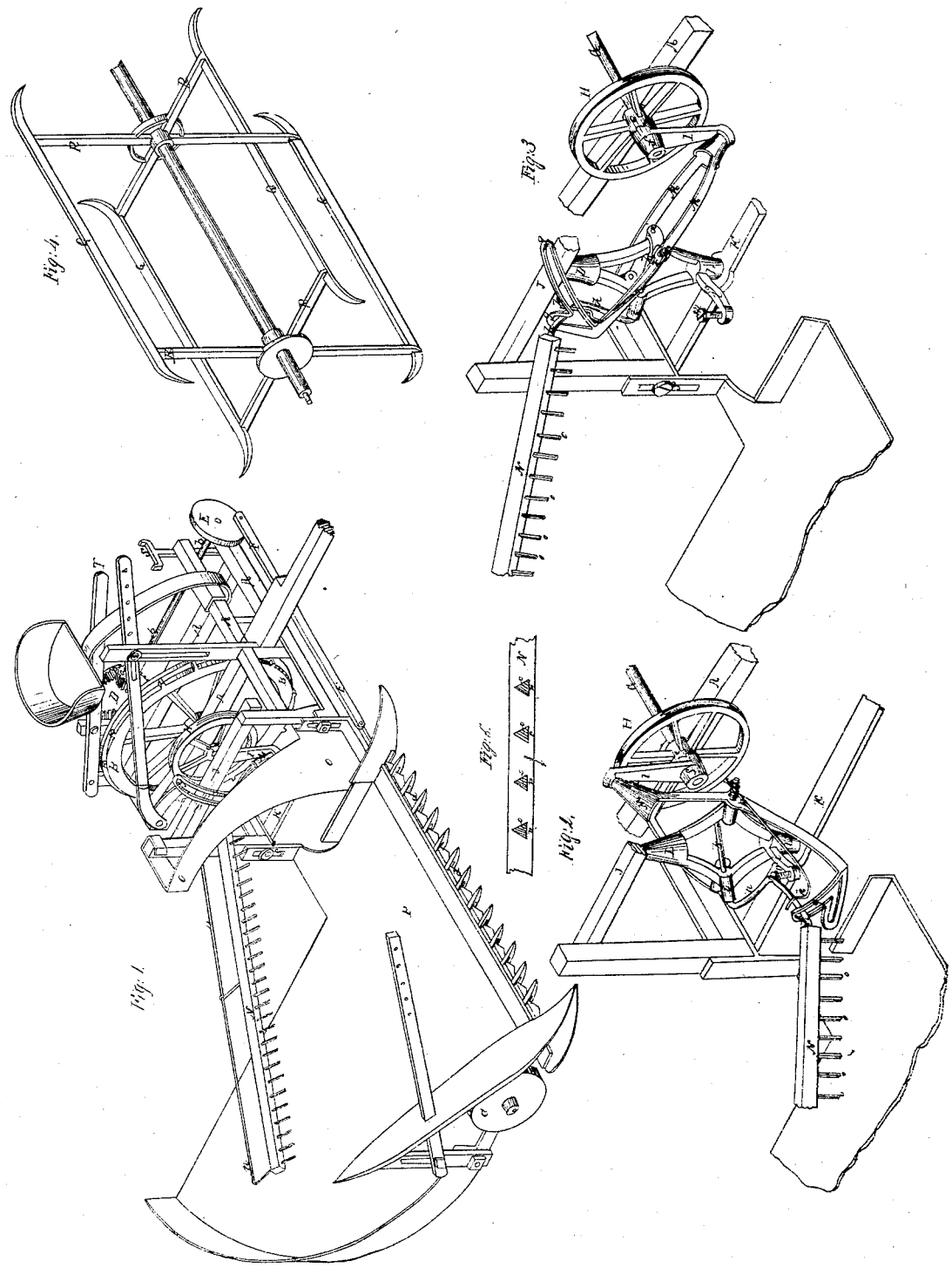

UNITED STATES PATENT OFFICE.

SALEM T. LAMB, OF NEW WASHINGTON, INDIANA.

IMPROVEMENT IN SELF-ACTING RAKES FOR HARVESTERS.

Specification forming part of Letters Patent No. 17,685, dated June 30, 1857.

*To all whom it may concern:*

Be it known that I, SALEM T. LAMB, of New Washington, in the county of Clarke and State of Indiana, have invented certain new and useful Improvements in Self-Acting Rakes for Harvesting-Machines; and I do hereby declare the following to be a full, clear, and exact description of the construction and operation of the same, reference being had to the accompanying drawings, making a part of this specification, in which—

Figure 1 represents a perspective view of a harvesting-machine with the rake in question attached, the reel being removed to show better the parts behind it. Fig. 2 represents by a detached view the rake and its more immediately connected parts when it is in the act of clearing the platform of the fallen grain. Fig. 3 represents a similar detached view, showing the same parts when the rake, after it has delivered the gavel, is returning for a second similar operation. Fig. 4 represents a perspective view of the reel detached from the harvesting-machine, and Fig. 5 represents on an enlarged plan a section through the teeth of the rake to better show their three-sided form.

Similar letters of reference, where they occur in the several figures, denote like parts of the machine in all of them.

The nature of my invention relates to the construction and peculiar operation of a self-acting raking apparatus, which is guided, controlled, and adjusted in a manner that will be hereinafter explained.

To enable others skilled in the art to make and use my invention, I will proceed to describe the same with reference to the drawings.

The frame A, which supports and carries the several parts of the machine, is sustained by the main carrying and driving wheel B at one end, and by the smaller wheel C at the other end. The main wheel B is furnished with cogs, which take into and turn a pinion arranged on the end of a shaft which carries at its other end a bevel-gear, D, which meshes with a bevel-pinion, $a$, on the end of a shaft, $b$, the other end of said shaft $b$ carrying a crank-wheel, E, to a wrist-pin in which one end of the pitman F is attached, the other end thereof being connected to the cutter-bar $c$, for giving motion to the cutters $d$.

On the axle G of the main wheel is arranged a pulley-wheel, H, around which and around another pulley on the reel-shaft may pass an endless belt for driving the reel. The end of the hub $e$ of the pulley-wheel H has a set of rack or ratchet teeth formed upon it, (as seen in Figs. 2, 3,) into which a similar or corresponding set of ratchet-teeth on the hub $f$ of the crank I take, so as to form a clutch, but which can be readily unclutched, as will be explained.

In the top and bottom pieces, J K, (which are also parts of the frame,) are supported respectively the top and bottom journals of a vertical beam or rock-shaft, L, which is open at its center, and of a shape resembling the walking-beam of a steam-engine, but vibrates on its journals at the ends, instead of trunnions at its center, as the walking-beam does.

To the end of the crank I is attached by a pivot-connection a toggle-beam, M, the two arms of which are pivoted at the points most remote from each other at the center of the rock-shaft L. One of the arms of the toggle-beam M continues on past the rock-shaft, and has upon its extreme end both a vertically and horizontally slotted guide-piece, $g$, through which the shank $h$ of the rake N passes, and by which the motion of the rake is partially controlled. The shank of the rake $h$, after it passes through the guide-piece $g$, is bent around, as shown in the Figs. 2, 3, and then passes through hub-pieces $i\,i$, formed on the wide part of the rock-shaft L, so that the shank of the rake can turn or roll in said hubs as it traverses the circuit of its motion, said hub-pieces $i\,i$ standing at an angle of about forty-five degrees in a horizontal plane from the pivoting-points, to which the toggle-beam M is connected or attached to the rock-shaft L. The gyratory motion of the connecting-beam M rocks the beam L on its journals, and the rocking of the beam L works the rake N, said rake, however, being controlled by other devices, which will be described, viz: To prevent the rake from rising when it is clearing the platform a spring, $k$, is so arranged as to hold it down upon or to its work when raking, but going out of action when the rake is rising, and returning for the next succeeding operation. An arm, $l$, is also formed on the rock-shaft L, in the end of which is placed a set-screw, $m$. When the rake drops to commence the gathering of the gavel its shank drops until it comes against the set-screw m, which limits its descent, and by which it can be adjusted to suit the quantity of grain that is to form the gavel, and gather it without dragging or touching the platform, the spring k, as before described, preventing the rake from rising. The peculiar motion of the rake is a difficult one to describe, and although resembling much the motion of rakes obtained through other mechanical devices it has this great merit over those worked by cams—viz., that running the machine backward in no wise injures it, the rake going through the reversed movement with the same facility that it does the forward one; and it possesses a material advantage over those worked by cogged gearing—viz., lightness, cheapness, and great simplicity, involving no mechanical arrangement which could become disarranged, the rock and toggle beams making almost the entire working part of the rake in its many motions.

A shield, o, is placed at that end of the platform next the driving-gear under which the heel of the rake moves, the object of the shield being to turn the grain in onto the platform and to prevent it from entangling with the rake. A bow, n, is also placed on top of the rake-head to catch or prevent the falling grain from entangling with it when it is advancing to the front of the platform preparatory to its dropping thereon to commence clearing it.

The rake-teeth o are three-sided, as seen better in Fig. 5, and the square sides r work next the grain to be raked off the platform for two purposes, viz: first, it presents a broader sur-surface to the grain; and, secondly, it prevents the grain or any detached heads or grass from clogging between the teeth, for the moment anything passes beyond the face of the teeth the space between the teeth enlarges, and it immediately drops out or is driven out.

The platform P is made adjustable on the frame at the points s, and the reel is also made adjustable to the platform by the holes and slots in its supports.

The gathering-arms Q of the reel are straight between the arms R, that support them; but beyond the arms R they curve toward the standing grain, and at the same time taper off to a point, as seen in Fig. 4. The object of the curve is to turn or direct the grain more toward the center of the platform, and the points penetrate and divide the grain that is to be cut from that which is to be left standing.

S is a clutch-lever for throwing the rake out of gear with the drive-wheel when necessary, which is done by simply pressing on the said lever with the foot, and when it is desired to let the rake work the foot is removed, and a strained spring throws the clutch into action, and the rake moves on at once.

There are other parts of the machine which might be described, but as they are not immediately connected with the raking devices are omitted.

Having thus fully described the nature of my invention, what I claim therein as new, and desire to secure by Letters Patent, is—

1. In combination with a rake having the motions above described, the gyratory beam M and rock-shaft L, when the rake is attached to said rock-shaft, as shown, and the whole operates in the manner herein set forth.

2. In combination with a rake operating as above described, the slotted guide g for regulating or governing its motions, when combined with the beam M and shaft L, as set forth.

3. In connection with a rake having the motions above described, the combined use of spring k for holding it to its work and the set-screw m for regulating the extent of descent of said rake, substantially as set forth.

SALEM T. LAMB.

Witnesses:
 THOS. HARRY UPPERMAN,
 E. COHEN.